United States Patent
Hoehne et al.

(10) Patent No.: US 7,460,757 B2
(45) Date of Patent: Dec. 2, 2008

(54) DISTRIBUTOR SYSTEM AND METHOD FOR FIBRE OPTIC CABLES

(75) Inventors: Elke Hoehne, Stahnsdorf (DE); Klaus Klein, Berlin (DE); Steffen Laurisch, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/531,146

(22) PCT Filed: Oct. 31, 2003

(86) PCT No.: PCT/EP03/12119

§ 371 (c)(1),
(2), (4) Date: Mar. 29, 2006

(87) PCT Pub. No.: WO2004/049029

PCT Pub. Date: Jun. 10, 2004

(65) Prior Publication Data

US 2006/0193586 A1    Aug. 31, 2006

(30) Foreign Application Priority Data

Nov. 22, 2002   (DE) .................... 102 55 561

(51) Int. Cl.
*G02B 6/00* (2006.01)

(52) U.S. Cl. ............ 385/135; 385/42; 385/43; 385/44; 385/45; 385/46; 385/47; 385/48; 385/49; 385/76; 385/77; 385/134; 385/136; 385/137; 385/138; 385/139; 385/140

(58) Field of Classification Search ......... 385/134–140, 385/53, 76–77, 42–49
See application file for complete search history.

(56) References Cited

U.S. PATENT DOCUMENTS

| 4,697,874 | A | * | 10/1987 | Nozick ................. 385/134 |
| 5,212,761 | A | * | 5/1993 | Petrunia ............... 385/135 |
| 5,247,603 | A | * | 9/1993 | Vidacovich et al. ....... 385/135 |
| 5,402,515 | A | * | 3/1995 | Vidacovich et al. ....... 385/135 |
| 5,511,144 | A | * | 4/1996 | Hawkins et al. ......... 385/135 |
| 5,655,044 | A |   | 8/1997 | Finzel et al. |
| 5,787,219 | A | * | 7/1998 | Mueller et al. ......... 385/134 |
| 5,946,440 | A | * | 8/1999 | Puetz ................. 385/135 |

(Continued)

FOREIGN PATENT DOCUMENTS

DE   35 42 724   6/1987

(Continued)

*Primary Examiner*—Brian Healy
*Assistant Examiner*—Guy G Anderson
(74) *Attorney, Agent, or Firm*—Merchant & Gould P.C.

(57) ABSTRACT

The invention relates to a method and a device for coupling fiber optic cables. Said device comprises at least one module, which is equipped with at least one retaining unit for retaining at least two cassettes. The invention is characterized in that: a cassette is configured with at least one coupling element; at least one strand bundle can be fixed to the module, whereby said strand bundle can be split into at least two strands comprising at least one fiber optic cable; an excess length of strand can be retained by a cassette, the fiber optic cable or cables being connected to the coupling element and the cassette together with its retained strand being detachably connected to the retaining unit.

12 Claims, 4 Drawing Sheets

U.S. PATENT DOCUMENTS

Figure 1:
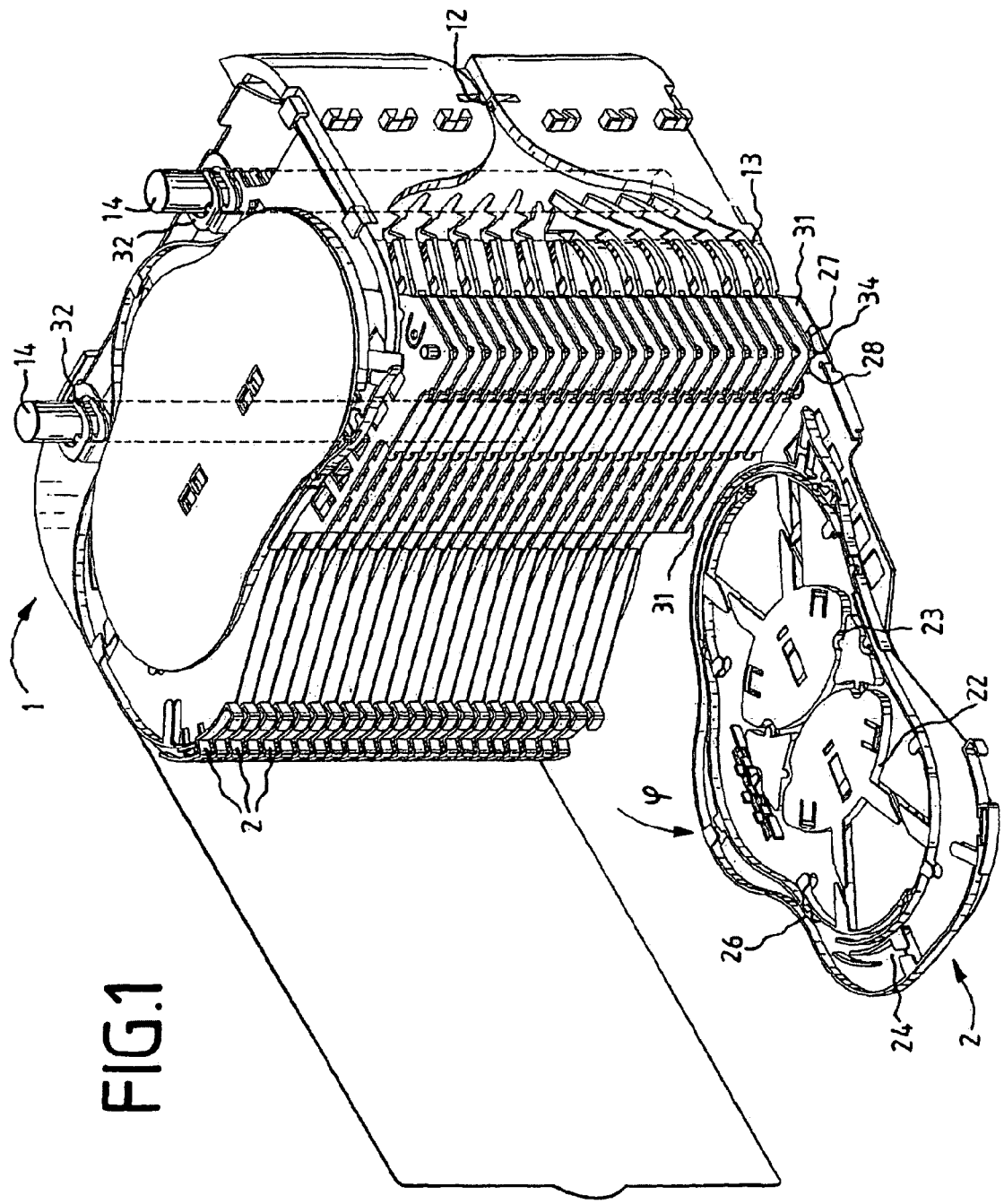

| | | | |
|---|---|---|---|
| 6,081,644 A | 6/2000 | Stateczny et al. | |
| 6,201,921 B1 * | 3/2001 | Quesnel et al. | 385/135 |
| 6,215,938 B1 | 4/2001 | Reitmeier et al. | |
| 6,909,833 B2 * | 6/2005 | Henschel et al. | 385/135 |

FOREIGN PATENT DOCUMENTS

| | | |
|---|---|---|
| DE | 29504191 U | 3/1996 |
| DE | 4442823 A1 | 6/1996 |
| EP | 215668 B1 | 12/1990 |
| EP | 0 501 336 | 9/1992 |
| EP | 0 550 327 | 7/1993 |
| EP | 0 715 196 | 6/1996 |
| EP | 0872750 B1 | 12/2001 |
| EP | 1 315 009 | 5/2003 |
| EP | 1 338 910 | 8/2003 |
| FR | 2 748 576 | 11/1997 |
| WO | 95/07477 | 3/1995 |
| WO | 96/19745 | 6/1996 |

* cited by examiner

DISTRIBUTOR SYSTEM AND METHOD FOR FIBRE OPTIC CABLES

The invention relates to a method and device for coupling optical fibers according to the preamble of patent claim 1.

It is known to couple optical fibers in cassettes. Cassettes for the coupling of optical fibers are known for example from U.S. Pat. No. 6,282,360 B1, the cassette being able to receive the optical fibers with an excess length for a splicing reserve. Cassettes of this type are to be designed in such a way that at least two cassettes can be stacked one on top of the other to form a module and the excess length of the optical fiber can be received while maintaining a minimum bending radius. For access to an optical fiber, it is in this case known to form the cassette in such a way that it can be pivoted in relation to the module.

In addition, EP 0 474 091 A1 discloses a pothead arrangement for optical fibers, comprising two shells connected to each other, the first shell being formed with a splicing element. For access to the splicing element, the shells are displaceable in a plane in relation to each other, the first shell receiving an optical fiber splicing reserve, the second shell receiving an optical fiber operating reserve and the optical fiber being arranged in such a way that it is capable of being trailed via a guide duct.

A distributing unit is generally formed by a number of modules. It is often not possible to work on the optical fibers at an installation location of the module in the distributing unit. In particular, splicing of optical fibers on splicing elements of a cassette preferably takes place at suitable splicing locations. It is therefore known to transport a module which is in operation and in which the corresponding cassette is mounted to a suitable workplace. A buffered fiber fed to the module is for this purpose formed with an excess length, so that, on the basis of removal of the module from the distributing unit and transport to the workplace, the buffered fiber can yield correspondingly. However, mechanical loading of the buffered fiber on account of the movement is unavoidable. It is disadvantageous in this case that even access to individual circuits comprising only a few optical fibers requires the entire buffered fiber, and consequently also the other circuits, to undergo loading on account of the movement.

The invention is therefore based on the technical problem of providing a device for coupling optical fibers bundled together in buffered fibers, with access to a subsystem, comprising at least one optical fiber, being possible at a workplace which is away from an installation location of the device without this affecting the other optical fibers.

A buffered fiber which can be divided into at least two strands, one strand comprising at least one optical fiber, is fixed on a module. A cable tie and/or snap-in lugs provided on the module are conceivable, for example, as fixing for the buffered fiber on the module. The module is formed with at least one receiving device, which can receive at least two cassettes. The module allows the cassettes to be arranged in a compact fashion. A strand with excess length can be received by the cassette and the at least one optical fiber of the strand can be connected to a coupling element of the cassette. For working at a workplace, a cassette with a received strand can be separated from the module at the receiving device in operation. In this case, the optical fibers of the associated strand are moved, the excess length reaching at least from the installation location to the workplace. The buffered fiber and/or further strands on the other hand are not adversely affected by access to the cassette. An empty cassette can likewise be removable from the module, which is of advantage for example for exchanging defective cassettes. A number of modules can be combined to form a distribution system, it being possible for a buffered fiber to be divided between a number of modules and/or for a number of buffered fibers to be received by one module. It is evident that the excess length of the buffered fiber known in the prior art is divided among the strands in the individual cassettes, it then being possible for the buffered fiber itself to be fixed without an excess length.

In a preferred embodiment, the cassette is formed with at least one guide element, the guide element defining at least one path for receiving at least one strand and a minimum radius of curvature of the path being greater than a minimum-permissible bending radius of the strand. The guide element is preferably formed in such a way that the winding direction of an optical fiber of the strand is reversible, so that two optical fibers of the strand can be connected by their ends coaxially to the coupling element.

In a further embodiment, the optical fibers of a strand are assigned to a circuit or circuits dependent on one another. During operation, the cassette to which the strand for forming the circuit and/or the dependent circuits is fed can be removed for access to the circuits. Circuits independent of this are not, however, adversely affected by this access.

In a preferred embodiment, the cassettes are formed as single-fiber cassettes, to which a circuit can be assigned. To form the circuit, two optical fibers can be connected to each other by the coupling element. In this case, both optical fibers can be fed to the cassette as a common strand, it being possible for the strand to be formed by one or two buffered fibers. In addition, it is also conceivable for the optical fibers to be fed to the cassette through different openings, with for example only one optical fiber being taken from the buffered fiber and fed to the cassette as a strand.

In a further embodiment, the coupling element of the cassette can be connected to an optical fiber element which is formed with a plug-in contact, at least at an end remote from the coupling element. By means of the coupling element, the optical fiber element can be connected to the strand, i.e. to at least one optical fiber of the buffered fiber. The connection of the optical fiber element to the coupling element can be established for example before the module is put into operation. The plug-in contact allows a detachable connection to be established quickly and reliably between the strand and an external optical fiber and/or a device which are formed with a plug-in element complementing the plug-in contact. The cassette therefore has great flexibility. In this case, the plug-in connection can subsequently be replaced by a fixed connection, and vice versa. On account of the fact that the buffered fiber itself is not moved during this necessary conversion work, the conversion performed on a cassette has no repercussions for the rest of the module. For this purpose, the plug-in contact with the associated optical fiber is simply disconnected at the coupling element and removed. Similarly, the associated patch cable with its complementary plug-in element is removed and a new optical fiber is subsequently connected by means of the coupling element to the optical fiber of the cassette, the other end of which is firmly connected to a device.

In a further embodiment, the coupling element is formed as a splicing element. A splicing element allows optical fibers to be connected in a reliable and simple way.

In a further embodiment, a receiving device of a cassette comprises through the module a guide rail, which can be firmly connected to the module. The cassettes are received by the guide rails in uniquely defined positions.

In a further embodiment, the receiving device of the cassette comprises a pivoting mechanism. Removal of the cassette is often not necessary for carrying out work on circuits. The pivoting mechanism has the effect that individual cassettes can be pivoted out of a module plane into a working area, optical fibers taken up by the movement only being subjected to low mechanical loading. A pivoting movement can be limited for example by stops and/or by guide grooves.

For this purpose, the pivoting mechanism is preferably formed with at least one spindle, by which the cassette can be received. For this purpose, the cassette is formed with a groove, by which the cassette can be connected transversely to the direction of the spindle to the latter. In addition, it is also conceivable to form the cassette with an aperture, so that the cassette can be fitted onto the spindle in the axial direction.

In a further embodiment, the receiving device of the cassette is formed by the module with a knurled screw. The knurled screw has the effect that the cassette can be fixed on the module in at least one position in the module plane.

Instead of the knurled screw, it is also conceivable to provide snap-in lugs on the module and/or on the cassette.

In a further embodiment, the cassette is formed with a receiving element, by which at least one optical fiber with a fiber protection can be received. If optical fibers are sheathed with a fiber protection, they often can no longer be received in the intended paths of the cassette. A corresponding element, which can for example be fitted onto the cassette, has the effect that the optical fibers can be protected better during transport to a workplace.

The device is preferably an element of a telecommunications distribution system.

Figure 2A:
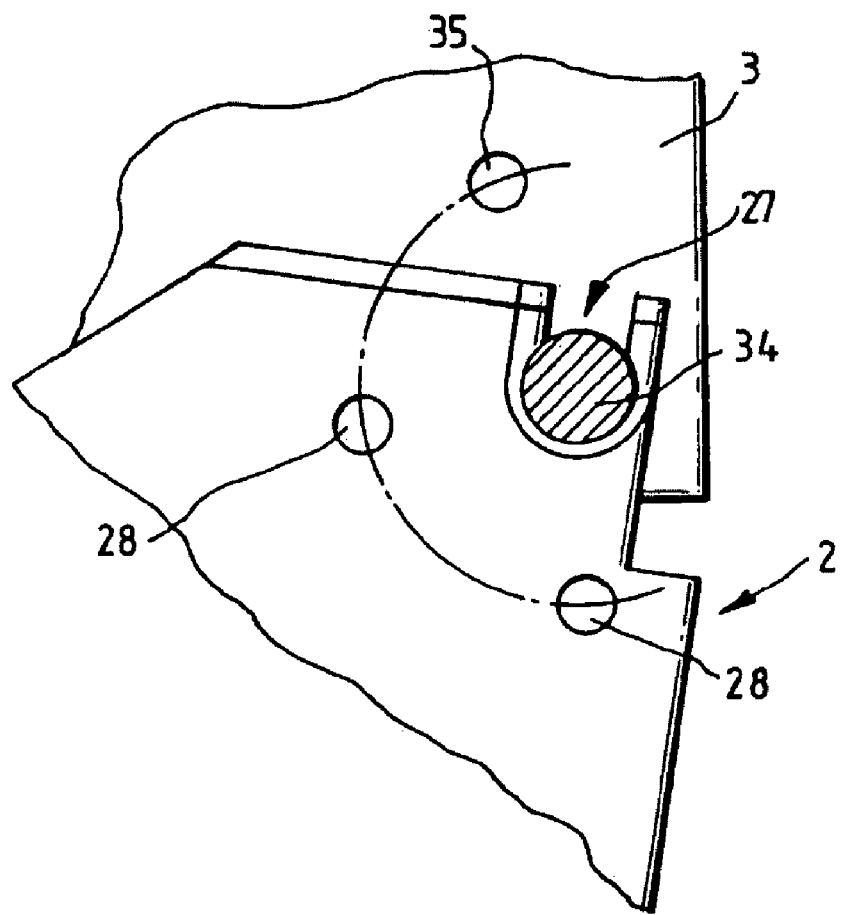
Figure 2B:
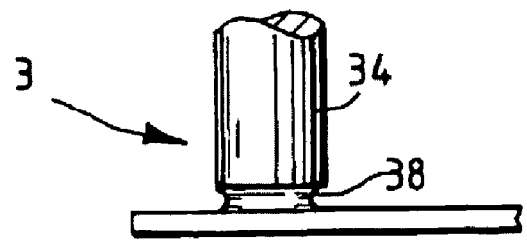
Figure 3:
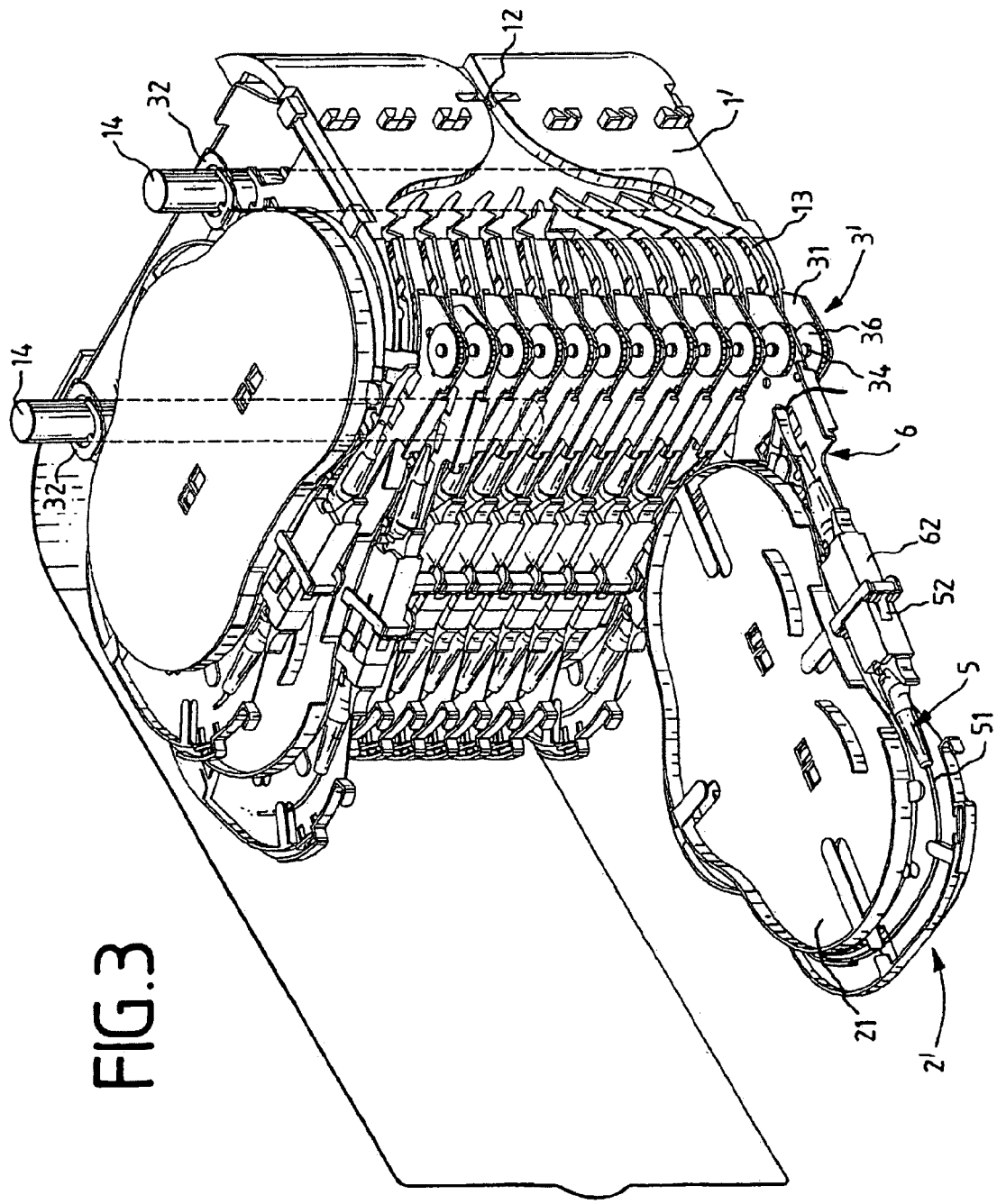
Figure 4A:
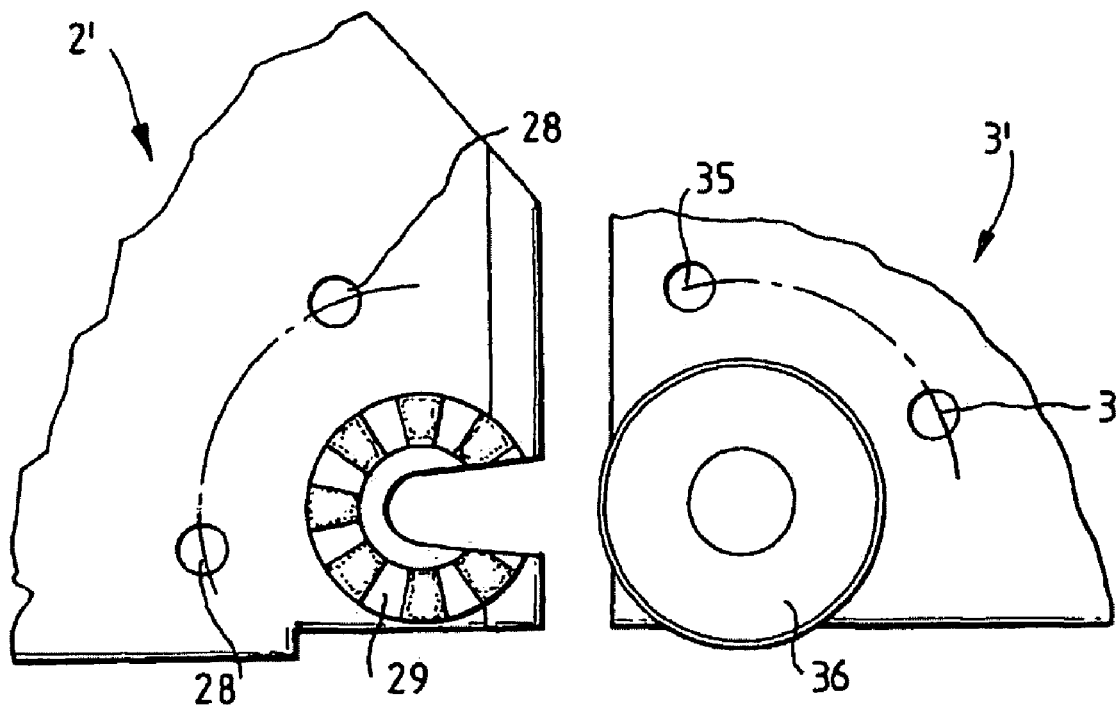
Figure 4B:
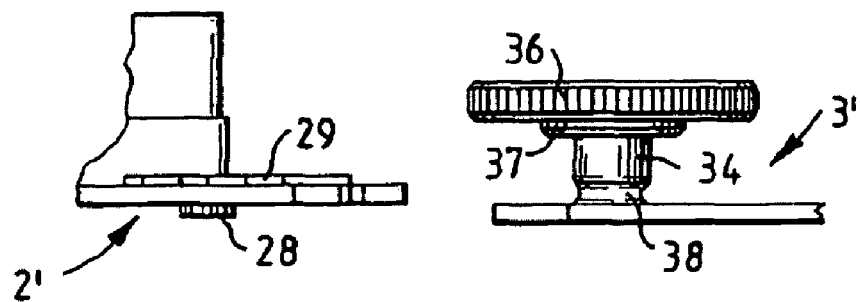

The invention is explained in more detail below on the basis of a preferred exemplary embodiment. In the figures:

FIG. 1 shows a schematic representation of a module comprising a number of cassettes which are formed as through-splicing cassettes, FIG. 2a shows a detail from a plan view of a receiving device and a cassette according to FIG. 1, FIG. 2b shows a side view of the receiving device according to FIG. 2a, FIG. 3 shows a schematic representation of a module comprising ten cassettes, which are respectively formed with a plug-in contact, FIG. 4a shows a detail from a plan view of a receiving device and a cassette according to FIG. 3 and FIG. 4b shows a detail from a side view of the elements according to FIG. 4a.

FIG. 1 schematically shows a module 1 comprising cassettes 2 and receiving devices 3. The cassettes 2 are formed as single-fiber through-splicing cassettes, i.e. each cassette 2 can be assigned a circuit comprising two optical fibers. The optical fibers are formed for example as fiber-optic cables.

Optical fibers (not represented) which can be assigned to the module 1 are bundled together in a buffered fiber (likewise not represented). The buffered fiber can be fed to the module 1 via an opening 12. At the opening 12, the buffered fiber can be fixed, for example by cable ties. The buffered fiber is subdivided inside the module 1 into strands (likewise not represented), each strand preferably comprising two optical fibers. In addition, it is also conceivable to feed a number of buffered fibers to the module 1 through the opening 12. The buffered fibers can in this case again be subdivided into strands, strands being able to comprise optical fibers of the same buffered fiber or different buffered fibers. The strands can be fed to the cassettes 2 through channels 13.

In the cassette 2, the optical fibers are laid along paths, which are defined by guide elements 22, 23, 24. In this case, the paths of the two optical fibers differ in such a way that a winding direction of an optical fiber is changed, so that the ends of the optical fibers can be connected coaxially in a coupling element 26.

For a connection of the optical fibers, the coupling element 26 is formed for example as a splicing unit. A connection of optical fibers by means of a splicing unit is preferably established at a splicing workplace. For this purpose, the associated cassette 2 can be removed from the module 1 and transported individually to a splicing workplace. For this purpose, the optical fibers are, for example, trailed along and must be of a length which is adequate for this. The reception of the optical fibers in the paths of the cassette 2 formed by the guide elements 22, 23, 24 is therefore formed in such a way that the optical fibers can be received with excess length. In this case, the excess length is chosen to correspond to the distance from the workplace plus the splicing reserve. Since the cassettes 2 can be removed individually from the module 1, access to a circuit for example is possible without influencing other circuits which are in operation.

The receiving devices 3 are formed with guide rails 31, it being possible for the guide rails 31 to be connected to profiled bars 14 of the module 1 by means of clips 32. The guide rail 31 is formed with spindles 34, by which the cassettes 2 can be received. For this purpose, the cassettes 2 are formed with an aperture 27. The position of the cassette 2 on the guide rail 31 and consequently in the module 1 can be fixed in a module plane by a snap-in lug 28. For access to a circuit, the corresponding cassette 2 can be pivoted about an angle ψ from the module plane into a working area. A movement of the cassette 2 transversely in relation to the spindle 34 allows the cassette 2 also to be removed from the module 1 and transported to a suitable workplace.

FIG. 2a shows a plan view of a connection of the cassette 2 to the receiving device 3. The reference numerals correspond here to FIG. 1. In the representation, the cassette 2 has been pivoted out of the module plane about the spindle 34 into the working area. The position of the cassette 2 can be fixed both in the working area represented and in the module plane by the snap-in lug 28, which engages in snap-in grooves 35 of the receiving device.

FIG. 2b shows a detail of a side view of the receiving device 3. The cassette 2 (not represented) engages with the groove 27 in an annular groove 38 on the spindle 34. A translatory movement of the cassette 2 along the spindle is restricted as a result.

FIG. 3 schematically shows a module 1' for receiving cassettes 2'. The same reference numerals have been used for elements which correspond to the elements from FIG. 1. One or more buffered fibers is or are fed to the module 1' through the opening 12 and subdivided into twelve individual strands. Each strand in this case comprises only one optical fiber. A strand can be fed to a cassette 2' along a channel 13. In a way analogous to the cassettes 2 represented in FIG. 1, the cassettes 2' are formed with guide elements for receiving the strand, which however are covered by a receiving element 21. The strand can be connected to a coupling element, which is likewise covered by the receiving element 21.

Apart from the strand which can be fed to the cassette 2' through the channel 13, at least a second optical fiber 5 can be received by the cassette 2'. The optical fiber 5 can be connected by one end to the coupling element. The other end of the optical fiber 5 is formed as a plug-in contact 52. A buffered fiber 51 of the optical fiber 5 is led along a path defined by guide elements in the cassette 2'.

The plug-in contact 52 allows the optical fiber 5 to be connected to further optical fibers 6 which are formed with a plug-in element 62 complementing the plug-in contact 52.

The connection to an optical fiber 6 is therefore extremely flexible and can be adapted quickly to changing requirements. The length of the buffered fiber 52 is to be chosen to correspond to the application. In the embodiment represented, contacts with further optical fibers 6 are established directly at the cassette 2'. In addition, it is also conceivable to use the plug-in contact 52 to establish a contact with a device which is away from the module 1'. The length of the buffered fiber 51 is to be adapted accordingly. For great flexibility, the buffered fiber 51 is preferably formed with excess length, which can be received in the cassette 2' in the paths provided for it.

The optical fibers are protected by the cassette 2' and the module 1' against mechanical loading. If, however, the cassettes 2' are removed from the module 1' and transported to a workplace—for example a splicing location, the optical fibers must be partly removed from the cassette 2'. To be able to protect the optical fiber better against mechanical loads in this case, the optical fiber can be sheathed with a fiber protection (not represented). However, optical fibers with fiber protection cannot be received by the paths which are defined by the guide elements 22, 23 and 24 visible in FIG. 1. Instead, the cassette 2' is formed with the receiving element 21. Optical fibers with fiber protection can be received by the receiving element 21.

A receiving device 3' of the cassette 2' through the module 1' comprises a guide rail 31', which is connected by the clips 32 to the profiled bars 14 of the module 1'. In a way analogous to the cassettes 2 represented in FIG. 1, the cassettes 2' have grooves 27, by which they can be fitted onto spindles 34 of the guide rails 31'. Knurled screws 36 allow the position of the cassettes 2' in the module plane to be fixed better.

FIG. 4a shows a plan view of the connection of the cassette 2' to the receiving device 3'. The reference numerals correspond in this case to FIG. 3. In the representation, the cassette 2' has been pivoted out of the module plane about the spindle 34 into the working area and removed from the module 1'. The position of the cassette 2' both in the working area and in the module plane can be fixed by the snap-in lug 28, which engages in snap-in grooves 35 of the receiving device. The connection is also reinforced by the knurled screw 36. On the underside, the knurled screw 36 is formed with a snap-in profile 37 (which cannot be seen), which complements a snap-in profile 29 on the cassette 2'.

FIG. 4b shows a side view of the components according to FIG. 4a. For the cassette 2' to be received by the receiving device 3', the cassette 2' is moved transversely in relation to the spindle 34, so that the groove 27 engages in the annular groove 28 on the spindle 34. A translatory movement of the cassette 2 along the spindle is restricted as a result. The knurled screw 36 is moved in the axial direction by a screwing movement about the spindle 34. As this happens, the snap-in profile 37 engages in the complementary snap-in profile 29. As a result, the cassette 2' can be positively connected to the receiving device 3'.

Apart from the modules 1, 1' represented, modules which have both through-splicing cassettes and cassettes with plug-in contacts are also conceivable. Since the cassettes can be removed from the modules at any time, corresponding adaptation is also possible after installation for the first time.

The modules are, for example, elements of a telecommunications distribution system. By the removal of individual cassettes, access to an individual customer circuit is possible even after installation for the first time, during operation, without influencing other customer circuits which are in operation.

LIST OF DESIGNATIONS 1 module
1' module
12 opening
13 channel
14 profiled bar
2 cassette
2' cassette
21 receiving element
22 guide element
23 guide element
24 guide element
26 coupling element
27 groove
28 snap-in lug
29 snap-in profile
3 receiving device
3' receiving device
31 guide rail
32 clip
34 spindle
35 snap-in groove
36 knurled screw
37 snap-in profile
38 annular groove
5 optical fiber
51 buffered fiber
52 plug-in contact
6 optical fiber
61 buffered fiber
62 plug-in element

What is claimed is:

1. A device comprising:
a housing defining a cavity, an opening at which a buffered fiber cable can be input into the housing, and at least one channel through which at least a first optical fiber of the buffered fiber cable can be fed, the housing including a spindle arranged adjacent the cavity;
a first cassette defining a groove having an open end and a closed end, the groove configured to receive the spindle through the open end to mount the first cassette within the cavity of the housing, the closed end of the groove cooperates with the spindle to form a pivot point about which the first cassette pivots, the first cassette being configured to receive and store an excess length of the first optical fiber, the first cassette also being configured to pivot about the pivot point from a first position, in which the first cassette is positioned within the cavity of the housing, to a second position, in which at least a portion of the first cassette is positioned outside the housing, the first cassette also being configured to be separated and removed from the housing by pivoting the first cassette to the second position and sliding the first cassette in a direction transverse to the spindle until the spindle passes through the open end of the groove;
wherein the excess length of the first optical fiber is sufficiently long to allow the separation and removal of the first cassette from the housing to a remote workstation.

2. The device of claim 1, wherein the first cassette includes a first coupling element at which the first optical fiber can be optically coupled to a second optical fiber.

3. The device of claim 2, wherein the first coupling element is formed as a splicing unit.

4. The device of claim 2, wherein the first coupling element is configured to receive first and second plug-in contacts.

5. The device of claim 2, further comprising a second cassette configured to mount within the cavity of the housing, the second cassette having a second coupling element configured to receive and store a wound, excess length of at least a third optical fiber.

6. The device of claim 5, wherein the second cassette is pivotally mounted to the housing.

7. The device of claim 6, wherein the second cassette is removably mounted to the housing.

8. The device of claim 5, wherein the second optical fiber forms the buffered fiber cable with the first optical fiber.

9. The device of claim 5, wherein the second optical fiber forms a second buffered fiber cable separate from the first buffered fiber cable.

10. The device of claim 1, further comprising a plurality of cassettes configured to mount within the cavity of the housing.

11. The device of claim 1, wherein the first cassette includes at least a first guide element defining at least one path for receiving at least the first optical fiber, the path defined by the guide element including a minimum radius of curvature greater than a minimum-permissible bend radius of the first optical fiber.

12. A device comprising:

a housing defining a cavity and a channel leading from an exterior of the housing to the cavity, the housing including a spindle arranged adjacent the cavity;

a first cassette pivotally mounted to the spindle of the housing, the first cassette including a splicing unit and at least one guide element, the first cassette defining a groove having an open end and a closed end, the groove being configured to receive the spindle of the housing through the open end to mount the first cassette within the cavity of the housing, the closed end of the groove cooperating with the spindle to form a pivot point about which the first cassette pivots, the first cassette being configured to pivot about the pivot point from a first position, in which the first cassette is positioned within the cavity of the housing, to a second position, in which at least a portion of the first cassette is positioned outside the housing, the first cassette also being configured to be separated and removed from the housing by pivoting the first cassette to the second position and sliding the spindle through the open end of the groove in a direction transverse to the spindle;

a first optical fiber extending through a channel in the housing to the first cassette, the first optical fiber being routed to the splicing unit by the guide element;

a second optical fiber extending through the channel in the housing to the first cassette, the second optical fiber being routed to the splicing unit by the guide element, wherein the second optical fiber is spliced to the first optical fiber and secured to the splicing unit of the first cassette.

* * * * *